United States Patent [19]

Bray et al.

[11] Patent Number: 5,387,850
[45] Date of Patent: Feb. 7, 1995

[54] ELECTRODELESS DISCHARGE LAMP CONTAINING PUSH-PULL CLASS E AMPLIFIER

[75] Inventors: Derek Bray, Los Altos; Timothy P. Murphy, Mountain View, both of Calif.

[73] Assignee: Diablo Research Corporation, Sunnyvale, Calif.

[21] Appl. No.: 894,020

[22] Filed: Jun. 5, 1992

[51] Int. Cl.[6] ............................................ H05B 37/00
[52] U.S. Cl. .................................... 315/248; 315/39; 315/344; 330/10
[58] Field of Search .................... 315/39, 248, 344; 330/10

[56] References Cited

U.S. PATENT DOCUMENTS

| | | | |
|---|---|---|---|
| 2,347,715 | 5/1944 | Spencer | 315/248 |
| 3,227,923 | 1/1966 | Marrison | 315/248 |
| 3,500,118 | 3/1970 | Anderson | 315/57 |
| 3,521,120 | 7/1970 | Anderson | 315/57 |
| 3,919,656 | 11/1975 | Sokal et al. | 330/51 |
| 3,987,334 | 10/1976 | Anderson | 315/57 |
| 3,987,335 | 10/1976 | Anderson | 315/62 |
| 4,010,400 | 3/1977 | Hollister | 315/248 |
| 4,017,764 | 4/1977 | Anderson | 315/248 |
| 4,024,431 | 5/1977 | Young | 315/248 |
| 4,048,541 | 9/1977 | Adams et al. | 315/248 |
| 4,117,378 | 9/1978 | Glascock, Jr. | 315/248 |
| 4,119,889 | 10/1978 | Hollister | 315/248 |
| 4,153,882 | 5/1979 | Fisher et al. | 330/10 |
| 4,166,234 | 8/1979 | Tak et al. | 313/486 |
| 4,171,503 | 10/1979 | Kwon | 315/248 |
| 4,178,534 | 12/1979 | McNeill et al. | 315/39 |
| 4,206,387 | 6/1980 | Kramer et al. | 315/248 |
| 4,240,010 | 12/1980 | Buhrer | 315/248 |
| 4,245,178 | 1/1981 | Justice | 315/248 |
| 4,245,179 | 1/1981 | Buhrer | 315/248 |
| 4,253,047 | 2/1981 | Walker et al. | 315/248 |
| 4,254,363 | 3/1981 | Walsh | 315/248 |
| 4,260,931 | 4/1981 | Wesselink et al. | 313/493 |
| 4,376,912 | 3/1983 | Jernakoff | 315/248 |
| 4,383,203 | 5/1983 | Stanley | 315/248 |
| 4,390,813 | 6/1983 | Stanley | 315/248 |
| 4,422,017 | 12/1983 | Denneman et al. | 315/248 |
| 4,536,675 | 8/1985 | Postma | 313/46 |
| 4,568,859 | 2/1986 | Houkes et al. | 315/248 |
| 4,622,495 | 11/1986 | Smeelen | 315/248 |
| 4,625,152 | 11/1986 | Nakai | 315/317 |
| 4,645,967 | 2/1987 | Bouman et al. | 315/248 |
| 4,661,746 | 4/1987 | Postma et al. | 315/248 |
| 4,675,577 | 6/1987 | Hanlet | 315/248 |

(List continued on next page.)

OTHER PUBLICATIONS

N. O. Sokal et al., "Class E Switching-Mode RF Power Amplifiers-Low Power Dissipation, Low Sensitivity to Component Tolerances (Including Transistors), and Well-Defined Operation", IEEE Electro Conference, New York, Apr. 25, 1979.

Brochure of The operating principles of the Philips QL lamp system, "QL Induction Lighting", Philips Lighting B.V., 1991.

H. O. Granberg, "Applying Power MOSFETs in Class D/E RF Power Amplifier Design", RF Design, 1985, pp. 302–307.

Primary Examiner—Robert J. Pascal
Assistant Examiner—Michael B. Shingleton
Attorney, Agent, or Firm—Skjerven, Morrill, MacPherson, Franklin & Friel

[57] ABSTRACT

A push-pull Class E amplifier is used to provide an efficient transfer of power to the induction coil in an electrodeless discharge lamp and to minimize the amount of radio frequency interference emitted by the lamp into the surrounding environment.

9 Claims, 2 Drawing Sheets

U.S. PATENT DOCUMENTS

| | | | |
|---|---|---|---|
| 4,704,562 | 11/1987 | Postma et al. | 315/248 |
| 4,710,678 | 12/1987 | Houkes et al. | 315/39 |
| 4,727,294 | 2/1988 | Houkes et al. | 315/248 |
| 4,727,295 | 2/1988 | Postma et al. | 315/248 |
| 4,728,867 | 3/1988 | Postma et al. | 315/248 |
| 4,792,727 | 12/1988 | Godyak | 315/176 |
| 4,797,595 | 1/1989 | De Jong | 313/493 |
| 4,812,702 | 3/1989 | Anderson | 313/153 |
| 4,864,194 | 9/1989 | Kobayashi et al. | 315/248 |
| 4,894,590 | 1/1990 | Witting | 315/248 |
| 4,922,157 | 5/1990 | Van Engen et al. | 315/248 |
| 4,926,098 | 5/1990 | Tarrillo | 315/408 |
| 4,927,217 | 5/1990 | Kroes et al. | 315/248 |
| 4,940,923 | 7/1990 | Kroontje et al. | 315/248 |
| 4,952,844 | 8/1990 | Godyak et al. | 315/205 |
| 4,962,334 | 10/1990 | Godyak | 313/619 |
| 4,977,354 | 12/1990 | Bergervoet et al. | 315/48 |
| 4,987,342 | 1/1991 | Godyak | 315/49 |
| 5,006,752 | 4/1991 | Eggink et al. | 313/161 |
| 5,006,763 | 4/1991 | Anderson | 315/248 |
| 5,013,975 | 5/1991 | Ukegawa et al. | 315/248 |
| 5,013,976 | 5/1991 | Butler | 315/248 |
| 5,023,566 | 6/1991 | El-Hamamsy et al. | 330/251 |
| 5,118,997 | 6/1993 | El-Hamamsy | 315/248 |
| 5,200,672 | 4/1992 | Sheynberg et al. | 315/248 |

ELECTRODELESS DISCHARGE LAMP CONTAINING PUSH-PULL CLASS E AMPLIFIER

FIELD OF THE INVENTION

This invention relates to electrodeless discharge lamps and in particular to an arrangement for a highly efficient electrodeless discharge lamp which generates acceptable levels of radio frequency interference.

BACKGROUND OF THE INVENTION

Electrodeless discharge lamps operate by using an induction coil to couple electromagnetic energy to a gas mixture, typically a metal vapor and an inert gas, which is enclosed in a sealed vessel. An oscillator is used to generate a high frequency signal which is amplified and delivered to the induction coil. Generally speaking, the lamp operates in two stages. In the start-up stage, the induction coil produces an electric field which ionizes some of the gaseous molecules, creating ions which in turn collide with other molecules, thereby producing further ions. This process continues until the steady-state stage is reached wherein a plasma of circulating charged particles is maintained, primarily by the magnetic field emanating from the induction coil. The stream of charged particles excites the metal vapor atoms, producing radiation, primarily in the UV spectrum, which impinges on a layer of phosphors which coats the walls of the vessel. As a result, the phosphors are excited and produce visible light.

This type of lamp is known as an electrodeless fluorescent lamp. Other types of electrodeless discharge lamps produce visible light directly from the gas contained in the sealed vessel.

Electrodeless discharge lamps, and in particular electrodeless fluorescent lamps, are much more efficient and long-lived than incandescent lamps. An electrodeless fluorescent lamp, for example, has a luminous efficacy of 60–80 lumens/watt, whereas tungsten incandescent lamps typically have a luminous efficacy of only 15–17 lumens/watt. Electrodeless discharge lamps accordingly offer the prospect of very significant energy savings. The development of this technology has been limited, however, by several problems, the foremost of these being the generation of radio frequency interference (RFI). The induction coil acts as an antenna. Even if the lamp operates at frequencies which are approved by the FCC (e.g., 6.78 or 13.56 MHz), the lamp typically generates harmonics of the fundamental frequency which are not within approved wavebands. Another problem has been to minimize losses which occur in the amplification of the high-frequency signal before it is delivered to the induction coil. These problems have been particularly troublesome because the apparatus used to solve them must fit within the confines of an electric light bulb and must not unduly raise the costs of manufacturing the light bulb.

Class E amplifiers are known to be highly efficient, and their use in an electrodeless discharge lamp is described in U.S. Pat. No. 4,245,178 to Justice. The theory underlying Class E amplifiers is described in U.S. Pat. No. 3,919,656 to Sokal et al., which is incorporated herein by reference. The Justice patent, however, describes only a single-ended Class E amplifier and offers no solution to the RFI problem. The single-ended Class E amplifier produces a half sine wave which is rich in harmonics. Moreover, Justice relies on a self-oscillating circuit, containing a feedback winding on a toroidal core, to provide the operational frequency of the lamp. This arrangement does not yield a stable frequency.

The principles of this invention offer a cost-effective solution to both the efficiency and RFI problems.

SUMMARY OF THE INVENTION

In accordance with this invention, a push-pull Class E amplifier, containing two switching elements, is used to amplify the high-frequency signal in an electrodeless discharge lamp. The push-pull amplifier is preferably balanced and produces a modified full sine wave which has a far lower harmonic content than a half sine wave.

A center-tapped induction coil, which together with the plasma constitutes the load, is directly coupled to a DC source. Capacitors are connected in parallel with the induction coil. The values of these capacitors are chosen to provide resonance with the induction coil at a frequency lower than the operating frequency, and thus the parallel combination looks like a capacitor at the operating frequency.

An inductor is connected in series with each of the switching elements (typically field effect transistors (FETs)). These inductors combine with the coil/capacitor combinations to provide a damped series resonant circuit which substantially reduces the energy losses which occur during the switching of the FETs by causing the overall circuit to operate in a Class E mode. The inductors are also used to match the impedance of the coil load to that of the switching elements. The capacitors, in conjunction with the inductors, form a low-pass filter which substantially reduces the harmonics which are delivered to the coil.

DESCRIPTION OF THE INVENTION

Figure 1:
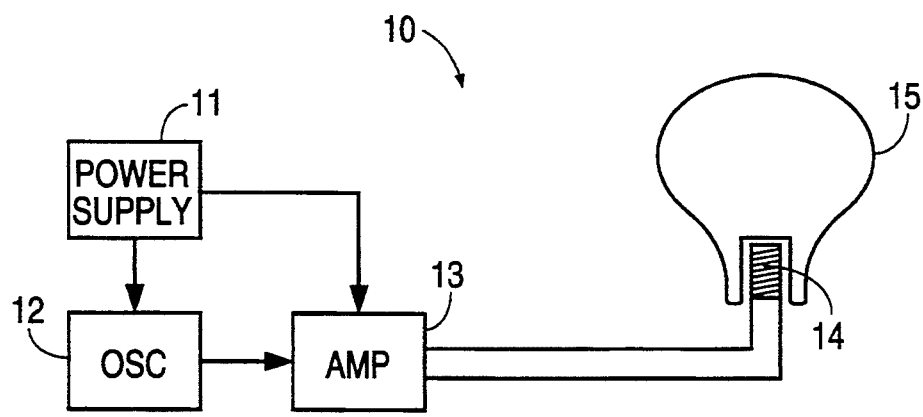
FIG. 1 illustrates a block diagram of an electrodeless discharge lamp.

A general block diagram of an electrodeless discharge lamp 10 is illustrated in FIG. 1. A power supply 11 rectifies the AC voltage from the power mains and supplies DC power to an oscillator 12 and an amplifier 13. Oscillator 12 is typically crystal driven. The amplified output of amplifier 13 is delivered to a coreless, cylindrical induction coil 14 which is situated in a cavity which protrudes into a sealed vessel 15. Sealed vessel 15 contains a mixture of a metal vapor, typically mercury, and a rare gas. When the high-frequency signal produced by oscillator 12 and amplified by amplifier 13 is delivered to induction coil 14, electric and magnetic fields are created inside vessel 15 and a plasma of charged particles is formed, as described above. The circulating charged particles collide with the metal vapor atoms, exciting them and causing them to emit radiation. In a fluorescent discharge lamp, the radiation is generally in the UV spectrum and impinges on phosphors which are coated on the inside of vessel 15. This excites the phosphors which in turn emit visible radiation. In other types of electrodeless discharge lamps, visible light is emitted directly by the gaseous atoms. The principles of this invention are applicable to both types of electrodeless discharge lamps.

As described above, two of the main problems in developing this technology have been in minimizing the transmission of radiation from coil 14 into the surrounding environment, including both the fundamental and harmonics of the frequency at which oscillator 12 operates, and minimizing losses in the transfer of power from power supply 11 to induction coil 14.

Figure 2:
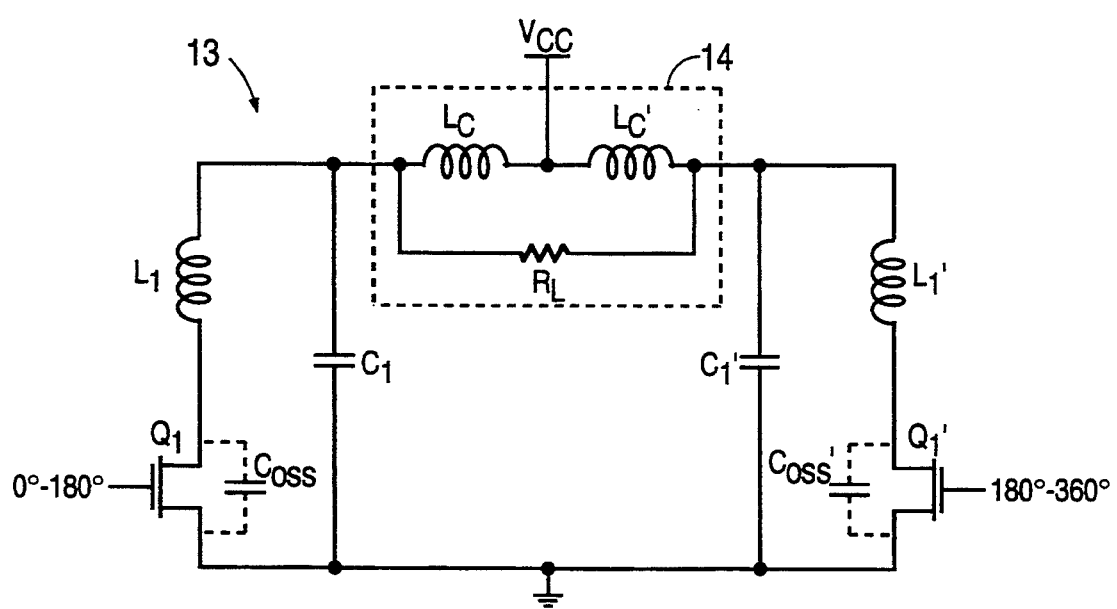
FIG. 2 illustrates a circuit diagram of a preferred embodiment of an amplifier in accordance with the invention.

Both of these problems are alleviated in the embodiment of amplifier 13 illustrated in FIG. 2. Amplifier 13 is shown as a Class E amplifier of the push-pull variety. Induction coil 14 is center-tapped and is represented schematically as two inductors $L_C$ and $L_C'$ and an equivalent parallel resistor $R_L$. Amplifier 13 includes switching field effect transistors (FETs) $Q_1$ and $Q_1'$, each of which operates out of phase with the other (i.e., one of the FETs is turned off when the other FET is turned on, referred to herein as the "push-pull mode") and has a duty cycle of 180°. The duty cycles of FETs $Q_1$ and $Q_1'$ may be reduced, however, without departing from the principles of this invention. Inductors $L_1$ and $L_1'$ are connected in series with induction coil 14, and capacitors $C_1$ and $C_1'$ are interposed between the respective sides of induction coil 14 and ground. FETs $Q_1$ and $Q_1'$ are shown as having inherent capacitances $C_{oss}$ and $C_{oss}'$, respectively.

The preferred embodiment is completely balanced, which means that $Q_1$ and $Q_1'$ are identical FETs, and $L_1=L_1'$, $C_1=C_1'$, and $L_C=L_C'$.

Several general observations will assist in understanding the design and operation of the circuit illustrated in FIG. 2. The components which represent center-tapped induction coil 14 ($L_C$, $L_C'$ and $R_L$), together with capacitors $C_1$ and $C_1'$, act as a capacitance at the operating frequency. This capacitive unit operates in conjunction with inductors $L_1$ and $L_1'$, respectively, to form a damped resonant circuit which minimizes the switching power losses in FETs $Q_1$ and $Q_1'$ in accordance with the teachings of the above-referenced U.S. Pat. No. 3,919,656 to Sokal et al. These relationships assure that the voltage across FETs $Q_1$ and $Q_1'$ is substantially equal to zero (actually $V_{DS(SAT)}$) when they turn off, and that the voltage across and current through FETs $Q_1$ and $Q_1'$ are substantially zero when they turn on. As described in the Sokal et al. patent and elsewhere, satisfaction of these conditions (referred to herein as the "Class E conditions") minimizes the power losses (voltage x current) in the intervals during which FETs $Q_1$ and $Q_1'$ are switching between their on and off states.

Inductors $L_1$ and $L_1'$ provide impedance matching and capacitors $C_1$ and $C_1'$ act as low-pass filters, minimizing harmonics of the fundamental frequency (determined by oscillator 12) from reaching induction coil 14.

The design of amplifier 13 involves finding the optimal compromise among several competing factors. The following describes a general methodology for this process.

1. The inductance and load of induction coil 14 are defined for the situation in which it is operating in an energized electrodeless discharge lamp.
2. FETs $Q_1$ and $Q_1'$ are selected to have output capacitances and breakdown voltages consistent with the power output requirements of the amplifier.
3. The capacitance ($C_x$) required to produce resonance with induction coil 14 at the desired operating frequency is calculated.
4. The values of the series inductors $L_1$ and $L_1'$ are calculated such that they provide the impedance transformations necessary to match the impedance of induction coil 14 to the respective impedances of FETs $Q_1$ and $Q_1'$.
5. The values of capacitors $C_1$ and $C_1'$ are calculated to provide a series resonance at the desired operating frequency with one of FETs $Q_1$ and $Q_1'$ turned on.
6. Using the calculated values, the performance of the damped resonant circuit is simulated on a computer to obtain the optimal voltage waveform at the drain terminals of FETs $Q_1$ and $Q_1'$ i.e. starting with $V=0$, when the FET turns off, the voltage at the drain terminals should vary such that $V=0$ and $dV/dt=0$ when the FET turns on.
7. The supply voltage $V_{CC}$ necessary to provide the desired output power is selected.
8. A breadboard with the component values obtained from the computer simulation is built and tested and those values are adjusted as necessary to meet the "Class E conditions" as described above, with a selected coil/plasma combination.

As will be appreciated by those skilled in the art, elements such as the coil inductance, plasma load impedance, parasitic coil capacitance, coil and capacitor tolerances, FET parasitic variations, the amplitude/impedance of the gate drive signal, and the layout parasitics will all have some impact on the design. The final solution will be the best compromise taking into account all of these variables.

An example of the method of constructing an amplifier in accordance with this invention will now be given. In the example, it is assumed that $L_C=L_C'=1.15$ $\mu H$, $R_L=4K\Omega$, the coupling factor $K=0.9$, and loaded $Q\cong10$. $Q_1$ and $Q_1'$ are FETs with an inherent capacitance $C_{OSS}\cong40pF$ and a breakdown voltage $V_p=200V$. The lamp will operate at $f_o=13.56$ MHz.

The power output $P_O$ is governed by the following relationship.

$$P_O \cong 0.8\, C_{OSS} V_p^2\, f_o$$

which yields $P_O \cong 18$ Watts.

The capacitance $C_x$ required to resonate with the induction coil is defined as follows:

$$C_X = \frac{1}{4\pi^2 f_o^2 4L_c}$$

$$C_X \cong 30\ pF$$

To keep the amplifier balanced, one-half of this capacitance (60pF) should be located on either side of induction coil 14.

Next, the value of the series inductors $L_1=L_1'$ is calculated, so as to provide impedance matching between induction coil 14 and FETs $Q_1$ and $Q_1'$ respectively. The following equation describes this relationship:

$$\frac{R_L}{Q^2}\left(\frac{4L_c+2L_1}{4L_c}\right)^2 = \frac{V_p^2}{2P_o}$$

Inserting values for $R_L$, Q, $V_p$ and $P_o$ yields:

$$\left(\frac{4L_c + 2L_1}{4L_c}\right)^2 \approx 25$$

$$\frac{4L_c + 2L_1}{4L_c} \approx 5$$

Since $L_c = 1.15 \ \mu H$, we get $2L_1 = 18.4 \ \mu H$ $L_1 = 9.2 \ \mu H$

Accordingly, the condition of impedance matching yields the series inductance $L_1 = L_1' = 9.2 \ \mu H$.

Next, $C_1 = C_1'$ is calculated so as to provide a series resonance at $f_o = 13.56$ MHz with one of FETs $Q_1$ or $Q_1'$ turned on. (Although the actual frequency of the series resonant circuit should be slightly greater than $f_o$ to satisfy the Class E conditions, the resulting error can easily be corrected through simulation and testing.)

$$f_o \approx \frac{1}{2\pi \sqrt{2L_1 \frac{\left(\frac{C_1}{2} - C_x\right) C_{oss}}{\frac{C_1}{2} - C_x + C_{oss}}}}$$

This expression can be solved for $C_1$.

$$C_1 = 2\left[\frac{C_{oss} + C_x(1 - 8\pi^2 f_o^2 L_1 C_{oss})}{1 - 8\pi^2 f_o^2 L_1 C_{oss}}\right]$$

$$C_1 = 2\left[\frac{C_{oss}}{1 - 8\pi^2 f_o^2 L_1 C_{oss}} + C_x\right]$$

$C_1 \approx 120$ pF

Figure 4:
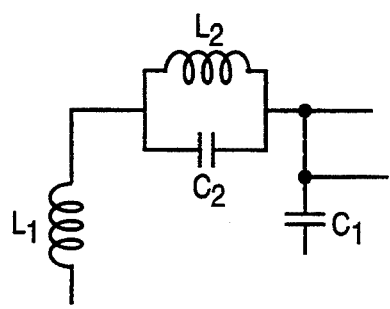
FIG. 4 illustrates a circuit diagram of a frequency trap which may be used in conjunction with the invention.

The values of $L_1$ and $C_1$ are further refined by simulation and testing, as described above. In most situations, the values obtained from $L_1$ and $C_1$ will assure that these elements will act as a low pass filter with regard to harmonics above the fundamental frequency. In the event that a specific harmonic frequency requires further attenuation, a frequency trap in the form illustrated in FIG. 4 may be interconnected between series inductor $L_1$ and induction coil 14. A similar trap would be connected between series inductor $L_1'$ and induction coil 14.

Figure 3:
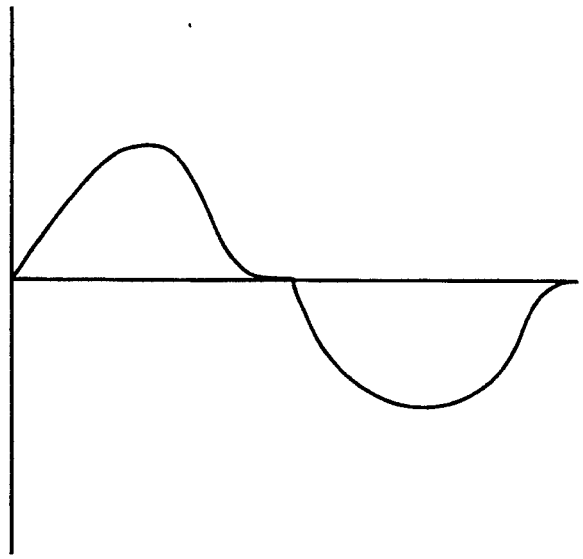
FIG. 3 illustrates a waveform produced by the amplifier of this invention.

Unlike a single-ended Class E amplifier such as is described in the above-referenced U.S. Pat. No. 4,245,178 to Justice, the push-pull amplifier of this invention provides a modified full sine wave having a form of the kind generally shown in FIG. 3. This waveform has a far lower harmonic content than the half wave output of a single-ended Class E amplifier.

The embodiments described above are intended to be illustrative and not limiting. Accordingly, many other embodiments will be apparent to those skilled in the art, all of which are within the broad scope of this invention, which is defined in the following claims. For example, push-pull Class E amplifiers having circuits different from the one illustrated in FIG. 2 may be found suitable in certain situations.

We claim:

1. An electrodeless discharge lamp comprising:
a sealed vessel containing a gaseous mixture;
an induction coil positioned adjacent said sealed vessel, said induction coil having a center terminal and first and second end terminals, said center terminal being connected to a source of constant voltage;
means for generating an oscillating electrical signal at a predetermined frequency; and
means for amplifying said oscillating signal, said means for amplifying comprising:
a first switching means and a second switching means, said first and second switching means being turned on out of phase with each other such that one of said first and second switching means is in an off condition when the other of said switching means is in an on condition;
a first inductor and a first capacitor, said first inductor and said first capacitor being connected to said first end terminal of said induction coil; and
a second inductor and a second capacitor, said second inductor and said second capacitor being connected to said second end terminal of said induction coil;
the values of said first and second inductors and the values of said first and second capacitors being selected such that said first and second inductors, said first and second capacitors and said induction coil together form at least a portion of a damped resonant circuit, said damped resonant circuit resonating in such a way that (i) the voltage across said first switching means is substantially zero when said first switching means turns off and the voltage across and current through said first switching means are substantially zero when said first switching means turns on, and (ii) the voltage across said second switching means is substantially zero when said second switching means turns off and the voltage across and current through said second switching means are substantially zero when said second switching means turns on.

2. The electrodeless discharge lamp of claim 1 wherein the values of said first and second inductors are selected to match the impedance of said induction coil to the impedance of said first and second switching means, respectively.

3. The electrodeless discharge lamp of claim 2 wherein said first inductor is connected in series between said first switching means and said induction coil and said second inductor is connected in series between said second switching means and said induction coil.

4. The electrodeless discharge lamp of claim 2 wherein the values of said first and second capacitors are selected so as to provide resonance with the induction coil at a frequency lower than the frequency of said means for generating an oscillating signal.

5. The electrodeless discharge lamp of claim 1 wherein said first switching means comprises a first transistor and said second switching means comprises a second transistor.

6. The electrodeless discharge lamp of claim 1 which said first switching means comprises a first field effect transistor and said second switching means comprises a second field effect transistor.

7. The electrodeless discharge lamp of claim 1 comprising means for resonating which, in conjunction with said induction coil, has a natural frequency substantially equal to the frequency of said means for generating an oscillating electrical signal.

8. The electrodeless discharge lamp of claim 7 comprising means for transforming the impedance of said induction coil so as to match the impedance of said induction coil to the impedance of said first and second switching means, respectively.

9. The electrodeless discharge lamp of claim 8 comprising means for filtering electrical signals having frequencies substantially greater than the frequency of said means of generating an oscillating electrical signal.

* * * * *